(12) United States Patent
Sauter et al.

(10) Patent No.: US 12,693,657 B2
(45) Date of Patent: Jul. 28, 2026

(54) PRODUCTION CONTROL WITH CAPABILITY AND/OR MANUFACTURER COMPARISON

(71) Applicants: TRUMPF SE + Co. KG, Ditzingen (DE); TRUMPF Werkzeugmaschinen SE + Co. KG, Ditzingen (DE)

(72) Inventors: Philipp Sauter, Stuttgart (DE); Florian Guentner, Ottenbach (DE); Carina Mieth, Gerlingen (DE); Maximilian Rolle, Gerlingen (DE)

(73) Assignees: TRUMPF WERKZEUGMASCHINEN SE + CO. KG, Ditzingen (DE); TRUMPF SE + CO. KG, Ditzingen (DE)

( * ) Notice: Subject to any disclaimer, the term of this patent is extended or adjusted under 35 U.S.C. 154(b) by 792 days.

(21) Appl. No.: 18/062,615

(22) Filed: Dec. 7, 2022

(65) Prior Publication Data

US 2023/0096204 A1      Mar. 30, 2023

Related U.S. Application Data

(63) Continuation of application No. PCT/EP2021/065429, filed on Jun. 9, 2021.

(30) Foreign Application Priority Data

Jun. 10, 2020      (DE) .......................... 102020207298.1

(51) Int. Cl.
*G05B 19/418* (2006.01)
*G06Q 30/0201* (2023.01)

(52) U.S. Cl.
CPC ..... *G05B 19/4183* (2013.01); *G05B 19/4187* (2013.01); *G06Q 30/0206* (2013.01)

(58) Field of Classification Search
USPC ......................................................... 700/116
See application file for complete search history.

(56) References Cited

U.S. PATENT DOCUMENTS

| | | | |
|---|---|---|---|
| 8,271,118 B2 | 9/2012 | Pietsch et al. | |
| 9,690,274 B1 | 6/2017 | Markov et al. | |
| (Continued) | | | |

FOREIGN PATENT DOCUMENTS

| | | |
|---|---|---|
| CN | 103942610 A | 7/2014 |
| CN | 104781740 A | 7/2015 |
| (Continued) | | |

OTHER PUBLICATIONS

DE_102007041424_A1 (Year: 2009).*

(Continued)

*Primary Examiner* — Hien D Khuu
(74) *Attorney, Agent, or Firm* — LEYDIG, VOIT & MAYER, LTD.

(57) ABSTRACT

A method controls sheet metal processing of a sheet metal component to be manufactured with a plurality of processing steps. The method includes: A) reading in machine tool data and data of the sheet metal component to be manufactured, which includes (in any order): a) reading in the processing steps of the sheet metal component to be manufactured; b) reading in property parameters of the sheet metal component to be manufactured; c) reading in at least one basic processing capability of the machine tools; and d) reading in capability parameters of the machine tools. The method also includes B) creating a machine tool matrix made from machine tools suitable for manufacturing the sheet metal component; C) determining an optimized processing sequence in a form of a sequence of machine tools from the machine tool matrix; and D) outputting the optimized processing sequence.

16 Claims, 3 Drawing Sheets

(56) References Cited

U.S. PATENT DOCUMENTS

| | | | |
|---|---|---|---|
| 9,880,542 B1 | 1/2018 | Brown et al. | |
| 10,031,500 B1 | 7/2018 | Diaz et al. | |
| 10,281,902 B2* | 5/2019 | Coffman | G06N 5/04 |
| 10,338,565 B1* | 7/2019 | Coffman | G06N 20/20 |
| 2005/0096957 A1 | 5/2005 | Bayoumi et al. | |
| 2005/0137740 A1 | 6/2005 | Lindstrom et al. | |
| 2011/0160888 A1* | 6/2011 | Pietsch | G05B 19/40938 |
| | | | 700/98 |
| 2014/0067108 A1 | 3/2014 | Pedigo et al. | |
| 2014/0358268 A1* | 12/2014 | Kubli | G05B 19/40937 |
| | | | 700/97 |
| 2015/0142154 A1 | 5/2015 | Tiano | |
| 2017/0220016 A1* | 8/2017 | Zhou | G05B 19/0426 |
| 2021/0206244 A1* | 7/2021 | Nakagawa | B60J 5/042 |

FOREIGN PATENT DOCUMENTS

| | | | |
|---|---|---|---|
| CN | 106933200 A | 7/2017 | |
| CN | 104504540 B | 10/2017 | |
| CN | 107831745 A | 3/2018 | |
| CN | 110705872 A | 1/2020 | |
| DE | 102007041424 A1 | 3/2009 | |
| DE | 202009014918 U1 | 5/2011 | |
| WO | WO 2015058147 A1 | 4/2015 | |
| WO | WO 2015058152 A1 | 4/2015 | |
| WO | WO 2016018717 A1 | 2/2016 | |
| WO | WO 2018158404 A1 | 9/2018 | |
| WO | WO 2019078875 A1 | 4/2019 | |

OTHER PUBLICATIONS

DE 102017120383 A1 (Year: 2019).*

DE_102013221279_A1 (Year: 2015).*

Anonymous, "Genetic algorithm—Wikipedia," Jun. 2022, pp. 1-19, Retrieved from the Internet:< URL:https://en.wikipedia.org/w/index.php?title=Genetic_algorithm&oldld=960800816.

Shyh-Chang Lin et al, "A Genetic Algorithm Approach to Dynamic Job Shop Scheduling Problems," ICGA, 1997, pp. 481-488, ICGA, East Lansing, Michigan, USA.

Ling Ling Li et al., "An integrated approach for remanufacturing job shop scheduling with routing alternatives," Mathematical biosciences and engineering, Nov. 2019, pp. 2063-2085, vol. 16, No. 4, AIMS Press, Ibadan, Nigeria.

M. Gondran et al, "Comparison between 30 two approaches to solve the job-shop scheduling problem with routing," IFAC-PapersOnLine, Aug. 2019, pp. 2513-2518, vol. 52, Issue 13, Elsevier, Amsterdam, Netherlands.

Florian Pfitzer et al, "Event-Driven Production Rescheduling in Job Shop Environments," IEEE 14th International Conference on Automation Science and Engineering (CASE), Aug. 2018, pp. 1-6, IEE, Munich. Germany.

J. J. Van Hoorn, "The current state of bounds on benchmark instances of the jobshop scheduling problem," Journal of Scheduling, Oct. 2017, pp. 127-128, vol. 21, No. 1, Springer Link, Berlin, Germany.

Leila Asadzadeh, A local search genetic algorithm for the job shop scheduling problem with intelligent agents, Computers & Industrial Engineering 85, Apr. 2015, pp. 376-383, Elsevier, Amsterdam, Netherlands.

B. M. Ombuki et al, "Local search genetic algorithms for the job shop scheduling problem," Applied Intelligence, Jul. 2004, pp. 99-109, vol. 21, Issue 1, Springer Nature B.V., Boston, Massachusetts, USA.

Bernd Waschneck et al, "Optimization of global production scheduling with deep reinforcement learning," Procedia CIRP, 2018, pp. 1264-1269, vol. 72, Elsevier, Amsterdam, Netherlands.

Matthew Botvinick et al, "Reinforcement Learning, Fast and Slow," Trends in Cognitive Sciences, May 2019, pp. 408-422, vol. 23, Issue 5, ScienceDirect, Elsevier, Amsterdam, Netherlands.

T. Yamada et al, "Scheduling by genetic local search with multi-step Crossover," International Conference on Parallel Problem Solving from Nature, Sep. 1996, pp. 960-969; Springer, Berlin, Germany.

Simona Nicoara et al, "Simulation-based Optimization Using Genetic Algorithms for Multi-objective Flexible JSSP," Studies in Informatics and Control, Dec. 2011, pp. 333-344, vol. 20, No. 4, National Institute for Research and Development in Informatics, ICI Bucharest, Romania.

Carina Mieth et al, "Simulation-Based Investigation of Priority and Picking Rules for the Control of Material Flows in the Sheet Metal Industry," ASIM Fachtagung—Simulation in Produktion und Logistik, Sep. 2019, pp. 369-379, ASIM, Wismar, Germany.

* cited by examiner

PRODUCTION CONTROL WITH CAPABILITY AND/OR MANUFACTURER COMPARISON

CROSS REFERENCE TO RELATED APPLICATIONS

This application is a continuation of International Application No. PCT/EP2021/065429 (WO 2021/250080 A1), filed on Jun. 9, 2021, and claims benefit to German Patent Application No. DE 102020207298.1, filed on Jun. 10, 2020. The aforementioned applications are hereby incorporated by reference herein.

FIELD

The present disclosure relates to a method for controlling sheet metal processing and to a computer program product for such a method.

BACKGROUND

At the present time, production planning and production control in sheet metal processing are carried out manually to the greatest possible extent. In that case, before the beginning of production, an expert successively allocates sheet metal components to be manufactured to different machine tools for the purpose of processing.

WO 2015/058147 A1 has disclosed a method for determining the production costs of a component. To that end, a design engineer communicates the computer assisted design (CAD) data of the component to an individual potential manufacturer of the component. On the basis of the free capacities of the manufacturer and the estimated production costs for the component, the design engineer receives an offer for the production of the component. This offer is able to be constantly updated during the design procedure.

U.S. Pat. No. 10,338,565 B1, U.S. Pat. No. 10,281,902 B2 and U.S. Pat. No. 10,061,300 B1 disclose methods for forecasting the manufacturing time and manufacturing costs of a component on the basis of the CAD data thereof. The forecasts are based on various machine learning models.

DE 20 2009 014 918 U1 has disclosed an optimization device. The optimization device makes residual regions of metal sheets available to consumers in order to optimally utilize the material of the metal sheet.

In the magazine "Blech June 2010", there is a description on pages 42 to 46 of offer preparation and manufacturing allocation in sheet metal processing that are automatic to the greatest possible extent.

US 2014/0067108 A1 discloses manufacturing control that takes account of the state of various production machines.

SUMMARY

In an embodiment, the present disclosure provides a method that controls sheet metal processing of a sheet metal component to be manufactured with a plurality of processing steps. The method includes: A) reading in machine tool data and data of the sheet metal component to be manufactured, which includes (in any order): a) reading in the processing steps of the sheet metal component to be manufactured; b) reading in property parameters of the sheet metal component to be manufactured; c) reading in at least one basic processing capability of the machine tools; and d) reading in capability parameters of the machine tools. The method also includes B) creating a machine tool matrix made from machine tools suitable for manufacturing the sheet metal component; C) determining an optimized processing sequence in a form of a sequence of machine tools from the machine tool matrix; and D) outputting the optimized processing sequence.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
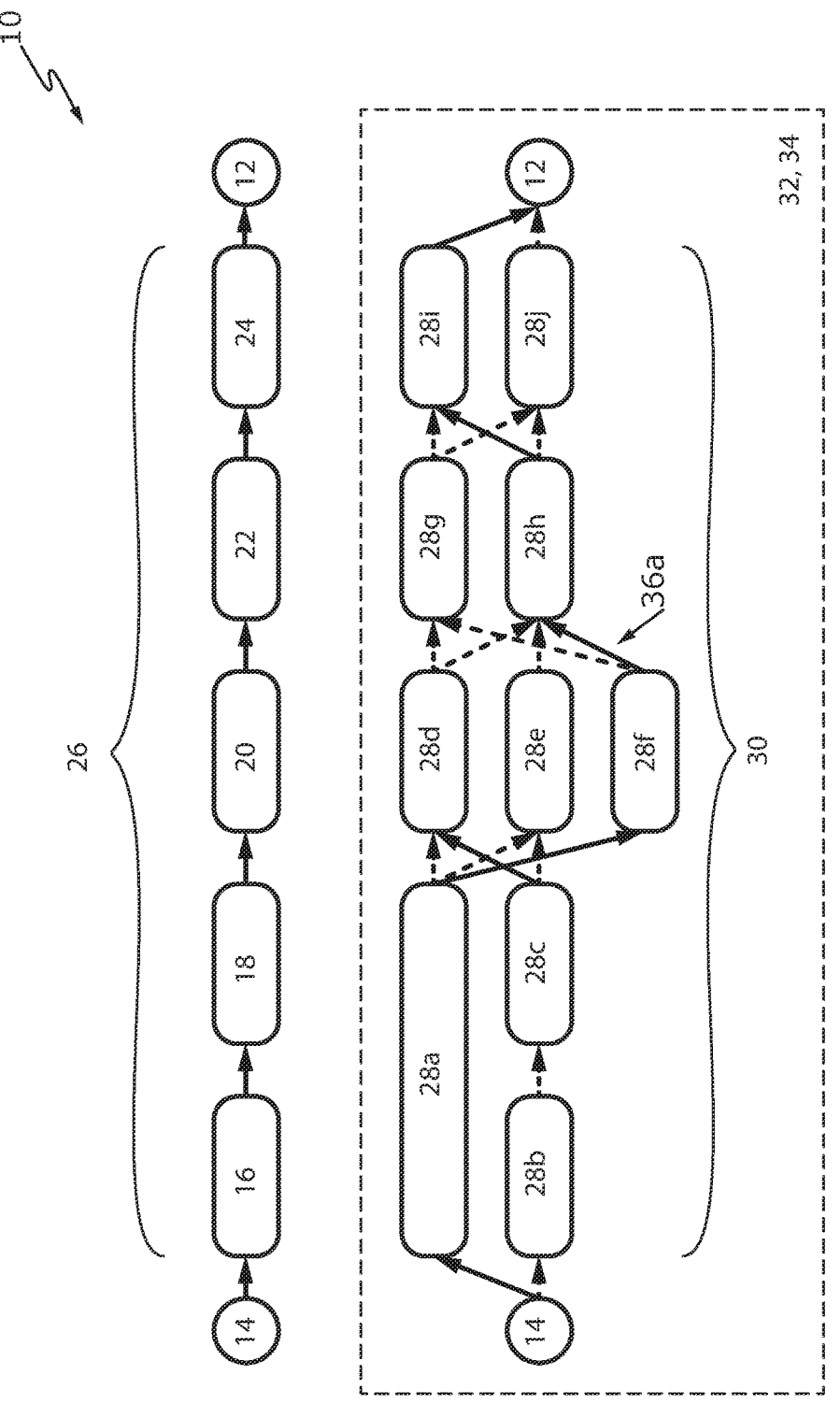
FIG. 1 shows a method for the optimized control of sheet metal processing with a plurality of machine tools arranged in a machine tool matrix.

A reaction to unpredictable events, such as the failure of a machine tool, for example, is often only possible in a complicated manner in the case of the known production planning facilities. Furthermore, the complex production planning is often not effected optimally with regard to the material used, the machine-tool capacity utilization and/or the production costs.

Aspects of the present disclosure, therefore, provide a method and a computer program product which significantly improve sheet metal processing.

Aspects of the present disclosure provide a method for the production planning of a sheet metal component to be manufactured, wherein the method comprises reading in machine tool data and data of the sheet metal component to be manufactured, creating a machine tool matrix made from suitable machine tools, determining an optimized processing sequence in the form of a sequence of machine tools from the machine tool matrix, and also outputting the optimized processing sequence.

Aspects of the present disclosure provide for setting up a matrix made from machine tools. In this case, the columns of the matrix can represent the processing steps of the sheet metal component, and the various machine tools suitable for the respective processing step can be listed in the rows of the matrix. As an alternative thereto, the rows of the matrix can represent the processing steps of the sheet metal component, and the various machine tools suitable for the respective processing step can be listed in the columns of the matrix. Determining an advantageous path (production graph) through the machine tool matrix allows significantly improved production of the sheet metal component.

Preferably, the method according to an aspect of the present disclosure is carried out by an algorithm. The method, in particular the algorithm, can be implemented in a cloud-based manner.

Reading in the machine tool data and the data of the sheet metal component to be manufactured comprises reading in processing steps and property parameters of the sheet metal component to be manufactured and also basic processing capabilities and capability parameters of the machine tools.

Processing steps can be for example separating, e.g. by means of stamping, laser cutting, plasma cutting or water jet cutting, reshaping, e.g. by means of bending or deep-drawing, welding, marking, e.g. by means of laser marking or embossing, etc. Property parameters can be for example dimensions, material and/or weight of the sheet metal component. Basic processing capabilities are for example the suitability for separating or reshaping. Capability parameters are for example the capability for accommodating and processing specific sheet metal component sizes and/or weights. Capability parameters can be for example the availability, the capacity, the speed and/or the precision of the machine tool. Basic processing capabilities are thus not taken to mean a specific technology (laser cutting, deep-drawing, etc.), but rather only the necessary processing task. Separating metal sheets can be done by e.g. a stamping machine, but also a laser cutting machine. Reshaping can be done by e.g. a bending machine and a stamping machine (e.g. for short lugs).

For the purpose of creating the machine tool matrix, it is possible firstly to compare the processing steps with the basic processing capabilities. If the basic processing capability of the machine tool corresponds to the processing step, i.e. if the respective machine tool can carry out the processing step, then it is possible to compare the property parameters of the sheet metal component to be manufactured with the capability parameters of the respective machine tool. If the capability parameters of the respective machine tool fulfil the property parameters of the sheet metal component to be manufactured, the machine tool is included in the machine tool matrix. Creating the machine tool matrix is thus effected in at least two stages.

One example of an algorithm according to the present disclosure reads as follows:

```
If (basic processing capability = processing step) {
    Then stage 1 reached.
    If (capability parameter 1 = property parameter 1) {
        Then stage 2 reached.
        If (capability parameter 2 = property parameter 2) {
            Then stage 3 reached.
        If (capability parameter 3 = property parameter 3) {
```

Machine tool is then added to the machine tool matrix.

The processing steps of the sheet metal component to be manufactured are advantageously taken from a 3D model of the sheet metal component to be manufactured and/or a drawing of the sheet metal component to be manufactured. In particular, for concretization of the processing steps, it is possible to have recourse to tolerances saved in the 3D model and/or in the drawing.

The processing steps can be subdivided into a main group and at least one subgroup, in particular a plurality of subgroups. In this case, the main group can comprise processing steps according to DIN 8580. Particularly preferably, the main group comprises the processing steps "separating", "reshaping", "joining" and/or "coating". The subgroup(s) can comprise concretizations of these processing steps. By way of example, the processing step "separating" can comprise "cutting" and "stamping" in the first subgroup. In the second subgroup, by way of example, the processing step "cutting" of the first subgroup can comprise the processing steps "laser cutting" and "water jet cutting".

Finding an optimum production graph is referred to as solving a job shop scheduling problem (JSSP). Solutions and heuristics in this regard can be found in the following publications:

F. Pfitzer, J. Provost, C. Mieth, and W. Liertz, "Event-driven production rescheduling in job shop environments", in 2018 IEEE 14th International Conference on Automation Science and Engineering (CASE), IEEE, 2018, pp. 939-944;

C. Mieth, N. Schmid, A. Meyer, "Simulationsbasierte Untersuchung von Prioritäts- and Kommissionier-regeln zur Steuerung des Materialflusses in der Blechindustrie" ["Simulation-based examination of priority and order picking rules for controlling the material flow in the sheet metal industry"];

L. L. Li, C. B. Li, L. Li, Y. Tang, and Q. S. Yang, "An integrated approach for remanufacturing job shop scheduling with routing alternatives.", Mathematical biosciences and engineering: MBE, vol. 16, no. 4, pp. 2063-2085, 2019;

M. Gondran, M.-J. Huguet, P. Lacomme, and N. Tcher-nev, "Comparison between two approaches to solve the job-shop scheduling problem with routing", 2019;

J. J. van Hoorn, "The current state of bounds on bench-mark instances of the job-shop scheduling problem", Journal of Scheduling, vol. 21, no. 1, pp. 127-128, 2018;

S.-C. Lin, E. D. Goodman, and W. F. Punch III, "A genetic algorithm approach to dynamic job shop scheduling problem", in ICGA, 1997, pp. 481-488;

T. Yamada and R. Nakano, "Scheduling by genetic local search with multi-step crossover", in International Conference on Parallel Problem Solving from Nature, Springer, 1996, pp. 960-969;

B. M. Ombuki and M. Ventresca, "Local search genetic algorithms for the job shop scheduling problem", Applied Intelligence, vol. 21, no. 1, pp. 99-109, 2004;

E. S. Nicoara, F. G. Filip, and N. Paraschiv, "Simulation-based optimization using genetic algorithms for multi-objective flexible jssp", Studies in Informatics and Control, vol. 20, no. 4, pp. 333-344, 2011;

L. Asadzadeh, "A local search genetic algorithm for the job shop scheduling problem with intelligent agents", Computers & Industrial Engineering, vol. 85, pp. 376-383, 2015;

B. Waschneck, A. Reichstaller, L. Belzner, T. Altenmüller, T. Bauernhansl, A. Knapp, and Kyek, "Optimization of global production scheduling with deep reinforcement learning", Procedia CIRP, vol. 72, pp. 1264-1269, 2018;

M. Botvinick, S. Ritter, J. X. Wang, Z. Kurth-Nelson, C. Blundell, and D. Hassabis, "Reinforcement learning, fast and slow", Trends in cognitive sciences, 2019.

Determining the optimized processing sequence, i.e. the optimized production graph, is preferably effected by an artificial intelligence, preferably in the form of a neural network. The neural network can have been and/or be trained by means of machine learning. Neural networks are known to a person skilled in the art for example from:

Günter Daniel Rey, Karl F. Wender, "Neuronale Netze", 2nd edition, 2010, Huber.

For the purpose of determining the optimized processing sequence, the processing steps (e.g. separating, joining) can be allocated to the resources (machines). This allocation can take place by way of the following tasks:

association: association rules and Bayesian networks,
classification: decision trees and neural networks.

The full scope of the disclosure of the publications cited above is included (incorporated by reference) in the present description.

The optimized processing sequence can be output indirectly or directly to a manufacturing execution system (MES). This allows the production plan to be implemented directly on the machine tools.

Alternatively or additionally, the outputting can involve outputting on a display of markers of an indoor localization system. This enables decentralized control during ongoing operation.

The output of the optimized processing sequence can include the producibility of the sheet metal component. If no processing sequence is possible, then the sheet metal component is not producible.

In a particularly preferred configuration of the present disclosure, reading in data of the sheet metal component comprises detecting the position of the sheet metal component, in particular by means of an indoor localization system. The indoor localization system can comprise a plurality of tags that are localized by a plurality of receiver units distributed in the space. The tags are preferably assigned to sheet metal components to be manufactured, in particular attached to sheet metal components or their containers. In the case of an indoor localization system, the planning can be optimized further in an automated manner.

The processing sequence is preferably optimized for minimized processing costs, minimized processing time and/or minimized material consumption. In this case, processing time is preferably not taken to mean the time required by a machine tool for the manufacturing steps, but rather is taken to mean at least the total time required by a machine tool for a job. The processing time thus reveals how many jobs can be accomplished per machine tool and per unit time. With further preference, the processing time furthermore comprises the intralogistics and thus in total the throughput time for jobs, depending on machine tools involved. In other words, what is the time needed in total for the jobs from raw material arrival to the machine tool, between the machine tools and then for order picking at a supplier. In this case, therefore, routing of raw material/intermediate products/end products between suppliers and customer and within a customer's factory are taken into account.

In this case, identical characteristic variables can be allocated to these target variables in order to make them comparable with one another. By way of example, a price can be allocated to the processing time and/or the material consumption, such that they can be weighted relative to the processing costs.

In a further preferred configuration of the present disclosure, at least two machine tools are assigned to different manufacturers. In this case, the machine tool data can comprise manufacturer data that can be taken into account in the determination of the optimized processing sequence. As an alternative or in addition thereto, at least two machine tools can be situated at different production sites. As a result, it is possible to provide a marketplace for the optimum processing of sheet metal components with the inclusion of different manufacturers and/or different production sites.

The machine tool data can exclusively comprise manufacturer data. In this case, the optimized processing sequence is determined exclusively by the manufacturer data.

The manufacturer data can comprise information concerning the location of the machine tools. As a result, transport and order picking costs can be concomitantly included in the assessment. As an alternative or in addition thereto, the manufacturer data can comprise information concerning the material consumption and/or energy consumption. Transport and/or order picking costs can take account of offers from transport service providers directly, but also indirectly, e.g. by the incorporation of a logistics platform that compares the offers of different transport service providers.

The manufacturer data can contain the capacity and/or the material stock of the manufacturer. As an alternative or in addition thereto, the manufacturer data can comprise information concerning the production speed of the machine tools.

The manufacturer data can contain information about whether the manufacturer that makes available the machine tool potentially used is a single part manufacturer, an assembly manufacturer, a manufacturer for commodity sheet metal components (highly standardized simple sheet metal components), a manufacturer for welding assemblies and/or a manufacturer for assemblies with purchased parts. The manufacturer data can contain information about the machinery of the manufacturer, the certification of the manufacturer and/or the purchased services of the manufacturer. The manufacturer data can contain information about the number, kind and/or qualification of the manufacturer's employees. The manufacturer data can contain information about the industrial sectors of the manufacturer's customer, for example whether the manufacturer has previously already processed sheet metal components for medical products. Particularly preferably, the manufacturer data contain information concerning quality and/or price of previously processed sheet metal components, since this information is particularly meaningful with regard to renewed commissioning of a machine tool of this manufacturer. The manufacturer data can contain information concerning the delivery speed and/or delivery reliability during the production of previously manufactured sheet metal components. This information, too, is particularly meaningful. Furthermore, the manufacturer data can contain information about whether the manufacturer per se should be given preference. This makes it possible e.g. to check whether one manufacturer alone can actually manufacture a sheet metal component. If no processing sequence comprising only machine tools of the preferred manufacturer is obtained during the determination of an optimized processing sequence in step C, the sheet metal component cannot be manufactured by this manufacturer alone. In this way, other manufacturer data can also be given preference in order then to check whether manufacturing is possible exclusively in accordance with the preferred manufacturer data.

Particularly preferably, the manufacturer data are supplemented on the basis of an assessment of an already processed sheet metal component. In particular, this information can contain price, quality, processing speed and/or delivery date reliability. As a result, the selection of the machine tools can be further optimized.

In the method according to the present disclosure, it is possible to output the processing costs of the sheet metal component with application of the optimized processing sequence. In this case, the processing costs are preferably determined by a comparison with actually achieved market prices of comparable sheet metal components and/or by means of an algorithm-based price calculation of the sheet metal component to be manufactured, in particular on the basis of the CAD data thereof.

With further preference, the method according to the present disclosure comprises ordering material for producing the sheet metal component and/or shipping the sheet metal component after a processing step. As a result, material flow and/or logistics can be concomitantly optimized. In this case, the positioning/linking of machine tools at a production site and thus the routing of jobs can also be concomitantly taken into account.

The arrangement of the machine tools in relation to one another thus also plays a part within a factory (production site), as well as redundancies in the machine tool equipment, in order to ensure increased reliability and to compensate for (possibly additional) bottlenecks arising in the event of machine tool failures.

The machine routing can preferably be realized by means of two concepts. The first concept is based on the approach of the pull principle, while the push principle forms the basis for the second concept.

In the pull principle, the machine tool requests a work order as soon as the previous work order has left the machine tool. Each machine tool acquires a job request module.

This job request module is simultaneously an agent and consists of an enter block and a queue block. An enter block is used to load an already existing agent, in this case a work order, into a process. The queue block is a queue. This queue is very short with ideally one work order. The functioning of the job request module is implemented by way of four stages. If a work order leaves the queue, then a new work order is requested by way of a function. In the next stage, the work orders relevant to this machine tool are filtered out. The relevant work orders fulfil the following four conditions: They can be processed by the machine tool, are released, have the implementable processing step as next processing step and have as status "New" or "Plannable". There may then be a plurality of relevant work orders that together form a list. In the next step, the jobs from the list are prioritized. The priority rules preferably programmed in Kotlin are used for this purpose. Finally, the work order given the highest priority is passed on to the job request module.

The main differentiating feature of the push principle is a central control module. The work orders are actively assigned to the different machine tools by the central control module. It has the advantage that different routing concepts can be integrated, such as Pheromone Based Coordination (PHC), the Swarm of Cognitive Agents model (SCA) or the Queue Length Estimator (QLE). The central control module communicates with the individual machine tools and obtains required information. The latter is, for example, the queue length if a QLE is used, or the pheromone value in the case of PHC. For this purpose, the control agent firstly sends the job information to the machine agents. The latter process this information and send their return value back to the control agent. The control agent finally sends the job to the machine tool with the best return value. There is no job request module for the push principle, but rather a job acceptance module, which receives the allocated jobs. It consists of an enter block and a queue block. However, the queue has no capacity limitation. The filtering and prioritization are implemented in the control module.

The method can be carried out with a plurality of sheet metal components. In this case, at least one processing step of a sheet metal component can be delayed in order to be processed or shipped jointly with other sheet metal components. The processing of the sheet metal components can be understood as a job network. A job network is the linking of plan or manufacturing jobs across a plurality of manufacturing stages. In this case, each job in the job network has its own job number. The joint processing with other sheet metal components makes it possible to achieve in particular the material-saving separating of the sheet metal component from a metal sheet.

The manufacturer data and/or machine tool data and/or the data of the component to be manufactured can be read in via an input interface of an online platform. As an alternative or in addition thereto, at least one optimized processing sequence and/or total processing costs for producing the component to be manufactured can be output via an output interface of an online platform, preferably of the same online platform. In this case, the online platform can be embodied in the form of an online marketplace. That is to say that on this marketplace, a large number of buyers enter their request for ordering sheet metal components. The online marketplace generates a proposal of suitable manufacturers (i.e. on the basis of the manufacturer data and/or machine capabilities). These manufacturers then have the option of accepting the job and/or are allocated the job. If a manufacturer cannot carry out the job, then an alternative free manufacturer is chosen, which can accept the job and/or has the job transferred to it.

The online marketplace can comprise a plurality of interfaces for a plurality of buyers and/or a plurality of sellers.

Aspects of the present disclosure provide a computer program product comprising instructions which, when a program is executed by a computer, cause said computer to carry out the method described here.

The computer program product can comprise an online platform having an input interface for inputting the machine tool data, the manufacturer data and/or the data of the component to be manufactured. The online platform can furthermore comprise an output interface for outputting the optimized processing sequence and/or the total processing costs. The online platform can be embodied in the form of an online marketplace. The online platform can be embodied in a cloud-based manner.

Further advantages of the present disclosure are evident from the description and the drawings. Likewise, according to the present disclosure, the features mentioned above and those that will be explained still further may be used in each case individually by themselves or as a plurality in any desired combinations. The exemplary embodiments shown and described should not be understood as an exhaustive enumeration, but rather are of exemplary character for outlining the present disclosure.

FIG. 1 shows a method 10 for optimum production planning and/or production implementation. In this case, production encompasses the production of a sheet metal component 12 from a metal sheet 14. In the present case, production encompasses laser cutting 16, deburring 18, bending 20, welding 22 and packaging 24 of the sheet metal component 12 to be manufactured. The sheet metal component 12 to be manufactured thus passes through a plurality of processing steps 26.

The processing steps 26 are carried out by a plurality of here exemplary machine tools 28a-28j. The machine tool 28a is a combined stamping/laser cutting machine having the basic processing capabilities of cutting and deburring. The machine tool 28b is a machine tool whose basic processing capability is only cutting. The machine tool 28c is a deburring machine. The machine tools 28d-28f are bending machines. The machine tools 28g, 28h are welding machines. The machine tools 28i, 28j are packaging machines.

The machine tools 28a-28j are arranged in a machine tool matrix 30. Possible sequences of the processing steps 26 in the machine tool matrix 30 for producing the sheet metal component 12 are represented by dashed and solid arrows.

The machine tool matrix 30 can be part of an algorithm 32. The algorithm 32 can comprise a neural network 34, which determines an optimized production graph 36*a* through the machine tool matrix 30. This optimized production graph 36*a* is represented by solid arrows in FIG. 1.

Figure 2:
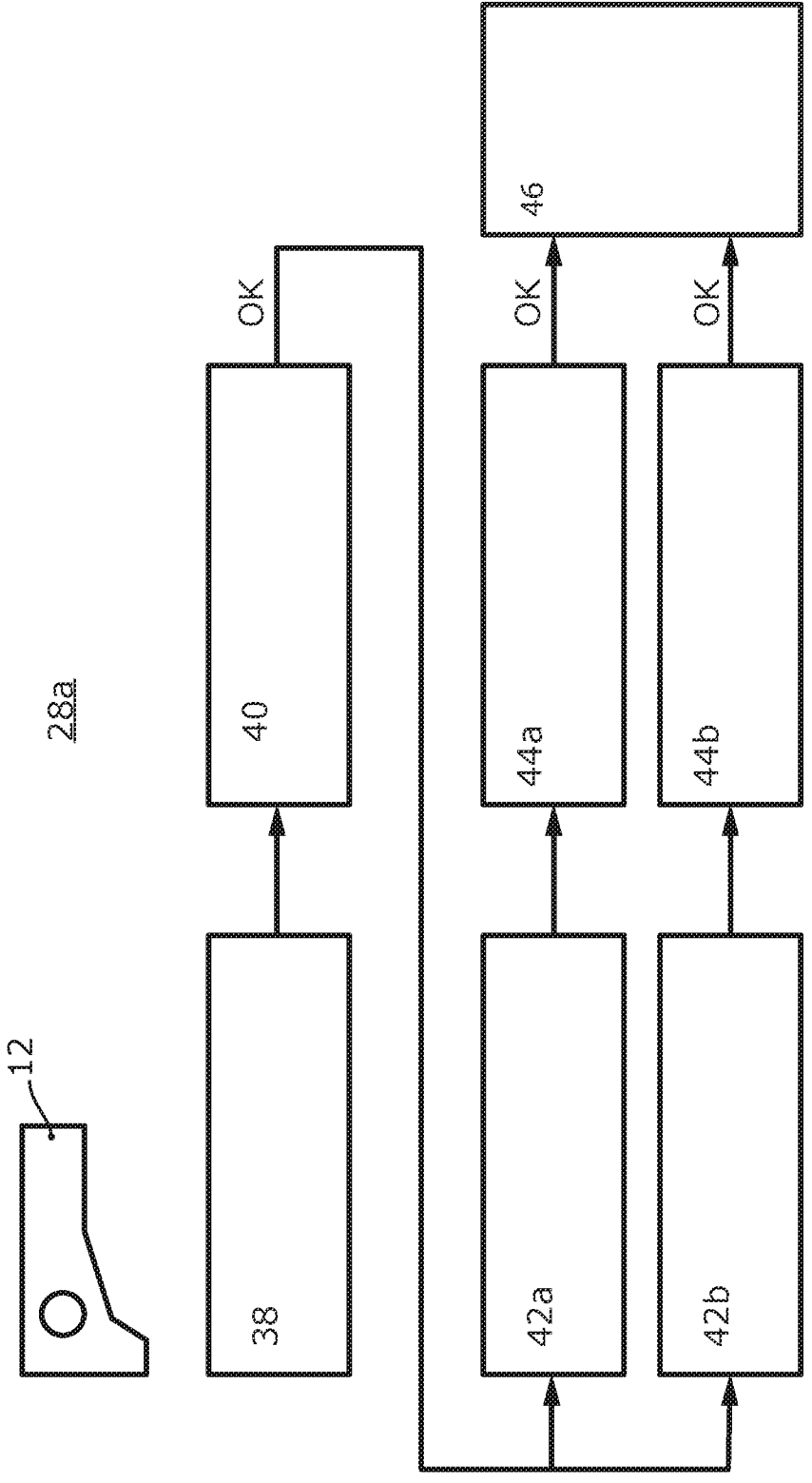
FIG. 2 shows the method for adding a machine tool to the machine tool matrix.

FIG. 2 shows part of the method 10, specifically by way of example, on the basis of the machine tool 28*a*, the selection method for including the machine tools 28*a*-28*j* in the machine tool matrix 30 in accordance with FIG. 1. In this case, parameters of the sheet metal component 12 to be manufactured are compared with parameters of the machine tool 28*a*.

To put it more precisely, firstly the basic property 38 of the processing step 16 (see FIG. 1) of the sheet metal component 12 to be manufactured, here laser cutting, is compared with the basic processing capability 40 of the machine tool 28*a*, here the capability of carrying out laser cuts. If, as in the present case, the basic processing capability 40 corresponds to the basic property 38, capability parameters 42*a*, 42*b* of the sheet metal component 12 to be manufactured are compared with property parameters 44*a*, 44*b* of the machine tool 28*a*. Capability parameter 42*a* could be for example the maximum weight of the sheet metal component 12 to be manufactured. Capability parameter 42*b* could be for example the maximum length of the sheet metal component 12 to be manufactured. Accordingly, the property parameter 44*a* would be the weight and the property parameter 44*b* the length of the sheet metal component 12 to be manufactured. If the two property parameters 44*a*, 44*b* lie within the capability parameters 42*a*, 42*b*, then in an inclusion step 46 the machine tool 28*a* is inserted into the machine tool matrix 30 (see FIG. 1) with respect to the processing step "laser cutting" 16.

The property parameters 44*a*, 44*b* can comprise manufacturer data. The manufacturer data can comprise the production capabilities of the manufacturer, the price-performance ratio of its products, the quality of its products, its delivery date reliability and/or the industrial sectors of its customers. This makes it possible to compare whether the machine tool 28*a* of this manufacturer is appropriate for the processing of the component 12 to be manufactured. The algorithm 32 can be configured to compare machine tools 28*a*-28*j* (see FIG. 1) of identical type from different manufacturers in order to ascertain the manufacturer data when finding the optimized production graph 36*a* (see FIG. 1).

Figure 3:
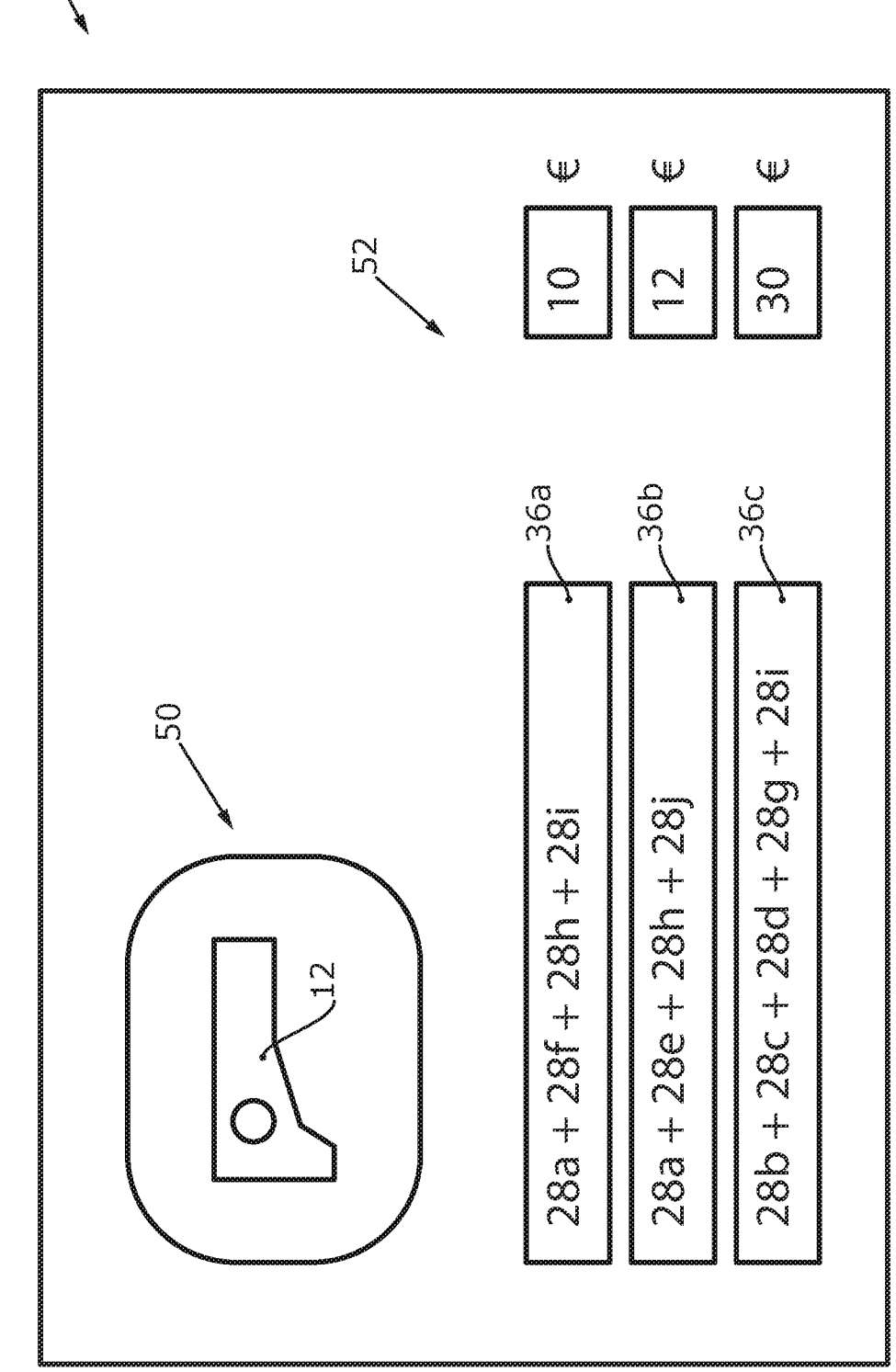
FIG. 3 shows an online platform for operator control of the method.

FIG. 3 shows an online platform 48. The online platform 48 is embodied in the form of an online marketplace. It comprises an input interface 50 for reading in data of the component 12 to be manufactured. As an alternative or in addition thereto, machine tool data and/or manufacturer data can be read in via the input interface 50. The online platform 48 furthermore comprises an output interface 52. After execution of the algorithm 32 (see FIG. 1), it is possible to output production graphs 36*a*-36*c* with the associated total processing costs of the component 12 to be manufactured upon acceptance of the respective production graphs 36*a*-36*c*. The different production graphs 36*a*-36*c* represent manufacturing in conjunction with different manufacturers. The respective production graphs 36*a*-36*c* can be selectable by the user of the online platform 48 for the purpose of ordering the component 12 to be manufactured by way of the respective production graph 36*a*-36*c*.

With all figures of the drawing being jointly taken into consideration, the present disclosure relates to a method 10 for controlling sheet metal processing with a plurality of processing steps 26, wherein at least one production graph 36*a*-36*c* is created in a machine tool matrix 30 in which the individual processing steps 26 are each assigned at least one machine tool 28*a*-28*j* suitable for carrying out the respective processing step 26, wherein the assignment is effected by comparing basic processing capabilities 40 of the respective machine tool 28*a*-28*j* and the capability parameters 42*a*, 42*b* thereof with the basic properties 38 and property parameters 44*a*, 44*b* of the sheet metal components 12 to be manufactured. An online platform 48, in particular in the form of an online marketplace having interfaces for a plurality of manufacturers, can be provided for inputting the data required for the method 10 and for outputting the data generated by the method 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Method
12 Sheet metal component
14 Metal sheet
16 Laser cutting
18 Deburring
20 Bending
22 Welding
24 Packaging
26 Processing steps
28*a*-28*j* Machine tools
30 Machine tool matrix
32 Algorithm
34 Neural network
36*a* Optimized production graph
36*b*, 36*c* Further production graphs
38 Basic property
40 Basic processing capability
42*a*, 42*b* Capability parameters
44*a*, 44*b* Property parameters
46 Inclusion step
48 Online platform
50 Input interface
52 Output interface

The invention claimed is:

1. A method for controlling sheet metal processing of a sheet metal component to be manufactured with a plurality of processing steps, wherein the method comprises:

A) reading in machine tool data and data of the sheet metal component to be manufactured, wherein the following operations are carried out in any desired order or simultaneously in step A):

a) reading in the plurality of processing steps of the sheet metal component to be manufactured;

b) reading in property parameters of the sheet metal component to be manufactured;

c) reading in at least one basic processing capability of machine tools; and d) reading in capability parameters of the machine tools;

B) creating a machine tool matrix comprising the machine tools suitable for manufacturing the sheet metal component, and carrying out the following operations:

e) comparing the processing steps of operation a) with the at least one basic processing capability of operation c), f) for cases in which the at least one basic processing capability fulfils the processing steps, comparing the property parameters of operation b) with the capability parameters of operation d), and g) including one or more of the machine tools in the machine tool matrix based on a determination that the one or more machine tools have capability parameters that fulfil the property parameters, wherein operations e), f) and g) are carried out successively or simultaneously for the machine tools;

C) determining an optimized processing sequence in a form of a sequence of machine tools from the machine tool matrix; and D) causing the sheet metal component to be manufactured based on the optimized processing sequence, wherein the processing steps in operation a) are based on tolerances of the sheet metal component taken from a 3D model of the sheet metal component to be manufactured or tolerances of the sheet metal component which are saved in a drawing of the sheet metal component to be manufactured.

2. The method according to claim 1, wherein the processing steps are subdivided hierarchically into a main group and at least one subgroup.

3. The method according to claim 1, wherein determining the optimized processing sequence in step C) is effected by a neural network trained machine learning.

4. The method according to claim 1, wherein the step D) comprises outputting the optimized processing sequence to a manufacturing execution system.

5. The method according to claim 1, wherein reading in data of the sheet metal component to be manufactured in step A) comprises detecting a position of the sheet metal component to be manufactured by an indoor localization system.

6. The method according to claim 1, wherein determining the optimized processing sequence in step C) is effected on the basis of minimized total processing costs, minimized total processing time of the sheet metal component to be manufactured and/or minimized total material consumption.

7. The method according to claim 1, wherein a plurality of the machine tools are assigned to different manufacturers, the machine tool data comprising manufacturer data.

8. The method according to claim 7, wherein the manufacturer data are taken into account when determining the optimized processing sequence in accordance with step C).

9. The method according to claim 7, wherein the manufacturer data comprises one or more of:

a single part manufacturer or assembly manufacturer;

a manufacturer for commodity sheet metal components;

a manufacturer for welding assemblies;

a manufacturer for assemblies with purchased parts;

a machinery of the manufacturer;

a quality of previously manufactured sheet metal components;

a delivery reliability;

a delivery speed;

a price of previously manufactured sheet metal components;

a speed during the production of previously manufactured sheet metal components;

a certification of the manufacturer;

an industrial sectors of the manufacturer's customers;

a number, kind and/or qualification of the manufacturer's employees;

a purchased service of the manufacturer;

a capacity of the manufacturer;

a material stock of the manufacturer; and/or a general preference of the manufacturer.

10. The method according to claim 7, wherein the method comprises:

E) supplementing the manufacturer data on the basis of an assessment of the manufactured sheet metal component.

11. The method according to claim 1, wherein outputting the optimized processing sequence in step D) comprises outputting the total processing costs, the total processing costs being determined on the basis of a comparison with actual market prices of identical or similar sheet metal components manufactured previously; and/or on the basis of an algorithm-based price calculation of the sheet metal component to be manufactured.

12. The method according to claim 1, wherein step D) comprises ordering material for producing the sheet metal component and/or shipping the sheet metal component to be manufactured after a processing step.

13. A non-transitory computer readable medium comprising instructions which, when executed by a computer, cause the computer to carry out the method according to claim 1.

14. The non-transitory computer readable medium according to claim 13, wherein the instructions being further configured such that when the computer executes the instructions the computer is caused to provide an online platform, the online platform comprising an input interface for inputting machine tool data and/or data of the component to be manufactured.

15. The method according to claim 1, wherein a plurality of the machine tools are situated at different production sites.

16. A method for controlling sheet metal processing of a sheet metal component to be manufactured with a plurality of processing steps, wherein the method comprises:

A) reading in machine tool data and data of the sheet metal component to be manufactured, wherein the following operations are carried out in any desired order or simultaneously in step A):

a) reading in the plurality of processing steps of the sheet metal component to be manufactured;

b) reading in property parameters of the sheet metal component to be manufactured;

c) reading in at least one basic processing capability of machine tools; and d) reading in capability parameters of the machine tools;

B) creating a machine tool matrix comprising the machine tools suitable for manufacturing the sheet metal component;

C) determining an optimized processing sequence in a form of a sequence of machine tools from the machine tool matrix; and D) causing the sheet metal component to be manufactured based on the optimized processing sequence, wherein the processing steps in operation a) are based on tolerances of the sheet metal component taken from a 3D model of the sheet metal component to be manufactured or tolerances of the sheet metal component which are saved in a drawing of the sheet metal component to be manufactured, and wherein the method is carried out with a plurality of sheet metal components to be manufactured, at least one processing step of one or more of the plurality of sheet metal components to be manufactured being delayed in order to be processed or shipped jointly with other sheet metal components to be manufactured.

<center>* * * * *</center>